Figure 1:
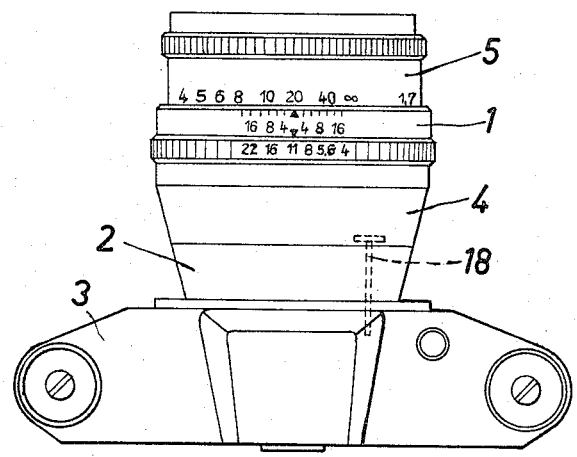

April 2, 1968   P. KLUPSCH   3,375,768
PHOTOGRAPHIC LENS MOUNTS INCLUDING AN AUTOMATIC DIAPHRAGM
Filed Oct. 6, 1966

Inventor
Paul Klupsch

United States Patent Office 3,375,768
Patented Apr. 2, 1968

3,375,768
PHOTOGRAPHIC LENS MOUNTS INCLUDING
AN AUTOMATIC DIAPHRAGM
Paul Klupsch, Jena, Germany, assignor to VEB Carl Zeiss
Jena, Jena, Gera, Germany
Filed Oct. 6, 1966, Ser. No. 585,224
1 Claim. (Cl. 95—45)

This invention relates to photographic lens mounts, particularly for long-focus lenses, including a spring-controlled preselection diaphragm.

In a known photographic lens mount equipped with a spring-controlled preselection diaphragm, the periphery of a leaf ring carries a setting arm which is at right angles to the plane of this ring and parallel to the optical axis of the lens and which, when the shutter is being cocked, urges a control ring or control lever to open the diaphragm to a maximum.

This known lens mount suffers from the disadvantage that the transmission of motion from setting arm to control ring or control lever takes place outside the plane of the leaf ring, so that the force inherent in the operation of adjusting the leaf ring gives rise to a tilting moment about an axis in the plane of this ring. As focusing causes a displacement of the leaf ring and consequently a displacement of the setting arm relative to the control ring or control lever along the optical axis, there is a change also in the magnitude of the tilting moment. When the diaphragm is being set, the tilting moment gives rise to increased frictional resistance in the leaf-ring bearings, which interferes with the working of the diaphragm mechanism particularly if the path length of the leaves and the focusing displacement of the diaphragm are considerable.

A futher disadvantage of the said known lens mount consists in that the setting arm of the leaf ring because of its comparatively great mass and its consequent great moment of inertia tends to retard rapid stopping down of the leaves to the preselected value, much to the detriment also of exact diaphragm setting particularly when small diaphragm apertures are concerned.

The present invention aims at reducing the foregoing disadvantages to a minimum by providing a lens mount which includes a spring-controlled preselection diaphragm and renders possible a great range of focusing displacement of this diaphragm along the optical axis and in which the diaphragm operates with smallest possible diaphragm masses and a minimum of leaf friction and permits fine adjustment to small apertures.

To this end the present invention consists in a photographic lens mount, particularly for long-focus lenses, including a spring-controlled preselection diaphragm displaceable along the optical axis in the focusing process, wherein a preferably radial arm in the plane of and fast with the periphery of a leaf ring urges against an edge of an adjusting body, this edge being parallel to the axis of rotation of said body, and wherein the axle of said body is inside of and fast with the photographic lens barrel and preferably parallel to the optical axis.

The invention presents the advantage that the transmission of motion from the radial arm of the leaf ring to the adjusting body takes place always in the plane of the leaf ring, regardless of focusing position. The setting of the leaf ring does not accordingly call forth any tilting moment, and there is no additional frictional resistance in the leaf-ring bearings.

A further advantage of the invention resides in the smallness of the radial arm on the leaf ring. Owing to the small mass of the radial arm, rapid motion of the leaf ring gives rise only to negligible forces of inertia. The spring power for starting the motion of the leaves may accordingly be comparatively small without impairment to the closing time of the diaphragm.

Figure 2:
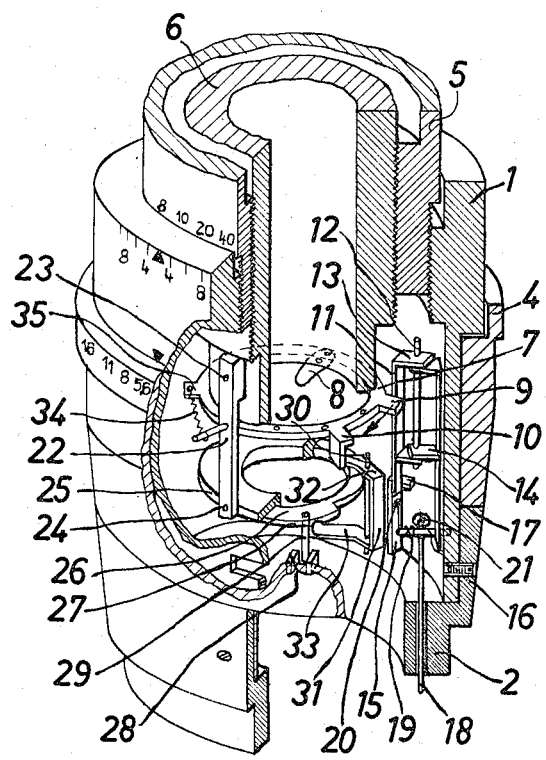

In order that the invention may be more readily understood, reference is made to the accompanying drawings which illustrate diagrammatically and by way of example one embodiment thereof, and in which FIG. 1 shows a photographic camera attaching a lens mount according to the invention, and FIG. 2 is a sectional view of this lens mount, identical reference numerals being used to indicate like parts.

In the drawings, a photographic lens barrel 1 comprises an adapter 2 for attachment to a camera 3, a diaphragm setting ring 4, a focusing ring 5, a focusing tube 6 and a diaphragm made up of a leaf ring 7 and leaves 8 (only one shown). The focusing ring 5 is mounted in the lens barrel 1. The focusing tube 6 lies in the focusing ring 5 and by suitable means (not shown) is secured against rotation relative to the lens barrel 1. Rotation of the focusing ring 5 in the barrel 1 causes the focusing tube 6 to be displaced along the optical axis. The leaf ring 7 and the leaves 8 are rotatably mounted on that end of the focusing tube 6 which is conjugate to the camera 3. Fast with the periphery of the leaf ring 7 is a radial arm 9 and a stop 10 which is bent parallel to the optical axis. The arm 9 urges against an edge 11 of an adjusting body 13. The body 13 is rotatable about an axle 12 parallel to the optical axis. The edge 11 is permanently parallel to the optical axis. The transmission of motion from the arm 9 to the edge 11 of the adjusting body 13 takes place in the plane containing the leaf ring 7, so that the diaphragm parts cannot tilt. The axle 12 is mounted in a plate 14 fast with the lens barrel 1. A reversing lever 15 rotatable about an axle 16 attached to the lens barrel 1 has an elbow 17 which urges against the adjusting body 13 and is actuated by means of an intermediate member 19 (shown in the drawing as a spring) and a transmission shaft 18 mounted in the body of the adapter 2. The one end of the member 19 is fixed to the reversing lever 15 by means of a lug 20, while the other end urges against a plate 21 fast with the shaft 18. A bearing ring 25 is rigidly connected to the focusing tube 6 by means of brackets 22 (only one shown) and bolts 23 and 24. A cam ring 26 having a cam 27 for preselection of the diaphragm aperture is rotatable in a recess of the bearing ring 25 about the optical axis and is adjustable by means of the diaphragm setting ring 4, a fork 28 fast with the ring 4, and a pin 29 fast with the ring 26. Fast with the focusing tube 6 is an axle 30 which is parallel to the optical axis and on which is rotatably mounted a U-shaped lever 31 comprising two limbs 32 and 33. (The connection of the axle 30 to the tube 6 is not shown in the drawing.)

The mechanism of the spring-controlled preselection diaphragm operates as follows: Rotation of the diaphragm ring 4 causes the desired diaphragm aperture to be preselected by means of the fork 28, the pin 29 and the cam ring 26. Winding the camera and consequent cocking of the shutter causes the shaft 18 to be displaced into and arrested in the lens mount by means not shown in the drawing, in consequence whereof the intermediate member 19, the reversing lever 15 and the adjusting body 13 rotate the leaf ring 7 in the sense of the arrow in FIG. 2, so that the greatest possible diaphragm aperture is set. As a consequence, a tension spring 34 is tensioned. The two ends of the tension spring 34 are respectively fast with the bracket 22 and a radial lug 35 on the leaf ring 7.

A release of the shutter liberates the transmission shaft 18. Under the influence of the tension spring 34 the leaf ring 7 is so rotated in the contrary sense of the arrow (FIG. 2) that the bent portion of the stop 10 on the leaf ring 7 contacts the limb 32 of the U-shaped lever 31 and rotates this lever until the limb 33 contacts the cam 27 of the cam ring 26, the diaphragm being thus closed to assume the desired aperture preselected on the cam ring 26.

I claim:
1. A photographic lens mount including a spring-controlled preselection diaphragm and comprising a lens barrel, a focusing tube, a leaf ring on and rotatable about said focusing tube, said focusing tube and said leaf ring being jointly displaceable along the optical axis in said lens barrel, a radial arm fast with said leaf ring, a rotatable adjusting body parallel to the optical axis disposed between said barrel and said focusing tube, said adjusting body having an edge which is parallel to the optical axis and urges against said radial arm, the length of said edge corresponding to that of the greatest possible displacement of said focusing tube, and a shutter release, said adjusting body being permanently parallel to the optical axis and so tiltable by said shutter release that said diaphragm can be set at its greatest aperture against the action of a locking spring and can be released by said edge and said radial arm independently of the adjustment of said focusing tube.

References Cited

UNITED STATES PATENTS 2,980,002  4/1961  Anzai ---------------- 95—42
3,122,078  2/1962  Singer --------------- 95—42

JOHN M. HORAN, *Primary Examiner.*